United States Patent Office 3,819,817
Patented June 25, 1974

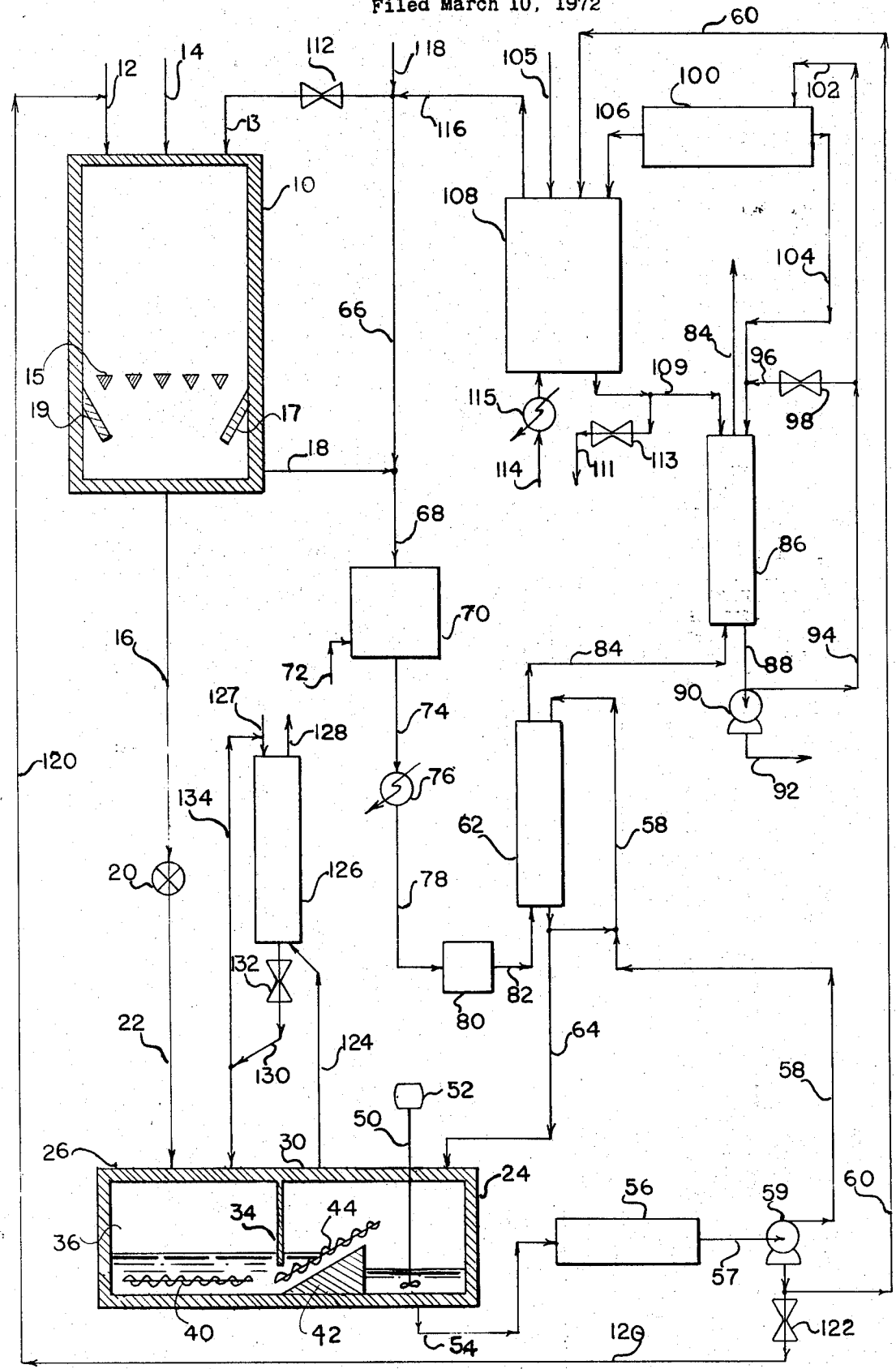

3,819,817
HYDROGEN SULFIDE SYNTHESIS
William Van Slyke, 2549 Harris Ave.,
Richland, Wash. 99352
Filed Mar. 10, 1972, Ser. No. 233,443
Int. Cl. C01b 17/16
U.S. Cl. 423—563    17 Claims

ABSTRACT OF THE DISCLOSURE

A process for the synthesis of hydrogen sulfide free of carbon dioxide comprising the steps of reacting a sulfur bearing material such as sodium sulfate or sodium sulfite with oxygen, carbon and steam under reducing conditions in the presence of hydrogen sulfide to produce sodium sulfide. This sodium sulfide is then reacted with acid to liberate hydrogen sulfide.

DISCLOSURE

There is a long felt need in the art for a practical industrial process for the synthesis of hydrogen sulfide free of carbon dioxide. In view of increasing interest in recent years in reduction of atmospheric pollution, there is also a need for a hydrogen sulfide synthesis process which does not cause atmospheric pollution by the discharge of oxides of sulfur, oxides of nitrogen, and hydrogen sulfide itself.

There are a large number of known processes for the synthesis of hydrogen sulfide. George et al. U.S. 3,591,332 discloses a process for the synthesis of hydrogen sulfide from calcium sulfate by producing calcium bisulfide which is subsequently converted to sodium bisulfide. An important feature of this process is the use of carbon dioxide which is completely contrary to the present invention. Additionally, this process requires numerous aqueous steps necessitating the handling of large volumes of liquid. Heredy U.S. 3,438,727 reacts carbon dioxide with sodium sulfide in order to produce hydrogen sulfide. This hydrogen sulfide is necessarily contaminated with carbon dioxide. Other patents disclosing hydrogen sulfide synthesis include Grantham U.S. 3,551,108 and 3,438,-728, Batchelor et al. U.S. 2,927,063 and Ahlborg et al. U.S. 2,864,669.

It is therefore an object of the present invention to provide an improved process for the synthesis of hydrogen sulfide which process is substantially free of one or more of the disadvantages of the prior art.

Another object of the present invention is to provide an improved process for the synthesis of hydrogen sulfide substantially free of all contaminating gasses such as carbon dioxide, nitrogen, oxygen, hydrogen and carbon monoxide.

A further object is to provide an improved process which produces hydrogen sulfide without contaminating the atmosphere with oxides of sulfur, reduced sulfur compounds such as hydrogen sulfide, and mercaptans, as well as particulate emissions.

A still further object of the present invention is to provide a process for the synthesis of hydrogen sulfide from readily available sulfur bearing materials such as sodium sulfate, sodium sulfite, and waste kraft and sulfite pulping liquors present in large quantities in the paper industry. In its broadest aspects the present invention is applicable to any sodium sulfur base pulping process.

Additional objects and advantages of the present invention will be apparent to those skilled in the art by reference to the following detailed description and drawings wherein there is shown a schematic representation of an apparatus suitable for practicing the process of the present invention.

According to the present invention, it has been discovered that hydrogen sulfide free of contaminating gasses can be produced by reacting a sulfur bearing material with oxygen, carbon, and steam under reducing conditions in the presence of hydrogen sulfide to produce a imetal sulfide, which is then reacted with an acid to liberate hydrogen sulfide.

The hydrogen sulfide is preferably present in an amount in excess of the equilibrium vapor pressure of hydrogen sulfide in contact with sodium sulfide.

The hydrogen sulfide is preferably added to the reaction zone as hydrogen sulfide. However, in the broadest aspects any volatile sulfur bearing material can be added to the reaction zone which under conditions in the reaction zone will produce hydrogen sulfide. Examples of such volatile sulfur bearing materials include among others elemental sulfur, sulfur dioxide, sulfur trioxide, dimethyl disulfide and methyl mercaptan. However, hydrogen sulfite itself is preferred for several reasons. First the required presence of hydrogen sulfide is assured no matter what conditions prevail in the reaction zone. This is especially advantageous during start up before steady state conditions have been reached. Second hydrogen sulfide is readily available since it is produced downstream of the reaction zone as explained more fully below.

The hydrogen sulfide is generally fed to the reactor in an amount sufficient to inhibit the production of carbonates and preferably in an amount such that the partial pressure of hydrogen sulfide is always greater than $10^{-6}$. However, the required partial pressure of hydrogen sulfide is inversely proportional to temperature. For reactor temperatures less than 550° C., sufficient hydrogen sulfide will be present if its partial pressure is equal to or greater than that given by the following formula:

$$pp = 0.575 - \frac{.001t}{°C.}$$

wherein:

$pp$ = the partial pressure of hydrogen sulfide
$t$ = the temperature in ° C.

On the other hand the partial pressure of hydrogen sulfide should generally not exceed 0.80 and preferably should not exceed 0.60. As these values are exceeded there remains insufficient oxygen in the gasses for the conversion of carbon to carbon monoxide. Therefore, the partial pressure of hydrogen sulfide should generally be between $10^{-6}$ and 0.80. At temperatures less than 550° C. the partial pressure of hydrogen sulfide is preferably between 0.60 and the value specified in the above formula; at temperatures greater than 550° C., it is preferably between $10^{-4}$ and 0.60. For practical reasons the partial pressure of hydrogen sulfide will usually be maintained at values greater than 0.02.

In the broadest aspects of the present invention, any sulfur bearing material can be employed. However, the preferred sulfur bearing materials are sulfites and sulfates of the alkali metals examples of which include among others sodium sulfite, sodium sulfate, potassium sulfite, potassium sulfate, lithium sulfate, rubidium sulfite, rubidium sulfate, cesium sulfite, cesium sulfate, mixtures thereof and complexes thereof. However, the preferred sulfur bearing materials are sodium sulfite and sodium sulfate. These materials are preferred because of their availability, reactivity, and ease of handling. The contacting of the sulfur bearing materials with oxygen, carbon, and steam can be effected under widely varying conditions, as long as the resultant product is the metal sulfide. However, they are preferably contacted at a temperature of 400° to 1000° C. and most preferably at a temperature of 600° to 750° C. At lower temperatures the reaction is uneconomically slow and requires an undesirably high partial pressure of hydrogen sulfide. At higher temperatures sodium metal begins to be vaporized and the sodium sulfide tends to melt.

It is absolutely critical to the practice of the present invention that reducing conditions be maintained in this reaction. Any combination of molar ratios and temperatures which will insure the presence of these reducing conditions is sufficient to achieve the advantages of the present invention. However, reducing conditions are most advantageously maintained by employing carbon in an atomic ratio of carbon to oxygen present in the sulfur bearing material of between 1:1 and 10:1 and preferably 2:1 and 4:1. After fixing the amount of carbon present, oxygen must be employed in less than the stoichiometric amount necessary to convert the excess carbon to carbon monoxide and generally in an atomic ratio of gaseous oxygen to excess carbon of less than 1:1 and preferably 1:2 to 1:5. By gaseous oxygen is meant the oxygen supplied as a gas, preferably in the form of air, to the reaction mixture. The term gaseous oxygen excludes that oxygen which is present in the sulfur bearing material most frequently as sulfite or sulfate.

The chemical composition of the metal sulfite produced will, of course, depend upon the metals present in the sulfur bearing material. However, when the sulfur bearing material is a compound of sodium, the metal sulfide will be sodium sulfide.

In the broadest aspect, any acid can be employed to react with the metal sulfide that will liberate hydrogen sulfide under the conditions of the reaction. However, the mineral acids are preferred. Examples of suitable mineral acids include among others hydrochloric acid, nitric acid, sulfurous acid, and sulfuric acid. Sulfuric acid and sulfurous acid are the preferred acids because they produce respectively sodium sulfate and sodium sulfite which can be easily recycled within the process. Furthermore, according to a preferred embodiment of the present invention, the sulfur dioxide or the sulfur trioxide necessary for producing the sulfurous or the sulfuric acid is internally produced within the process. The acid can be contacted with the metal sulfide at widely varying temperatures but is preferably contacted at temperatures between 0° C. and 100° C. and preferably between 20° C. and 60° C. The molar ratios of acid to metal sulfide can vary widely. However, the acid is presently employed in a stoichiometric excess in order to ensure complete conversion of the metal sulfide to hydrogen sulfide. Suitable molar ratios of acid to metal sulfide are between 1:1 and 50:1.

According to a preferred embodiment of the present invention wherein the sulfur bearing material is sodium sulfate and/or sodium sulfite, the acid is sulfuric acid. In the first step of the process, the sodium sulfite and sodium sulfate is converted to sodium sulfide. This sodium sulfide is then reacted with sulfuric acid to liberate hydrogen sulfide which is free of carbon dioxide and to produce sodium sulfate. The sodium sulfate is then itself reacted with carbon, oxygen, and steam under controlled conditions to produce sodium carbonate and impure hydrogen sulfide. In the broadest aspects of the present invention, any conditions which will produce sodium carbonate are suitable. However, this is generally accomplished at a temperature of 100° C. to 650° C. and preferably 300° C. to 550° C.

The impure hydrogen sulfide produced from the above step is reacted with oxygen preferably by burning the hydrogen sulfide in air to produce a mixture of sulfur trioxide and sulfur dioxide. If it is desired to increase the proportion of sulfur trioxide in the mixture, these gases be contacted with a suitable oxidation catalyst. Almost any catalyst can be employed which will encourage the conversion of sulfur dioxide to sulfur trioxide. Examples of suitable catalysts include among others vanadium pentoxide, platinum, activated charcoal, metal sulfides and metal oxides.

The gases rich in sulfur dioxide or sulfur trioxide are then contacted with water or dilute sulfurous and/or sulfuric acid to produce a more concentrated sulfurous and/or sulfuric acid. This sulfuric acid, however, is the preferred acid which is employed in the above described reaction of sodium sulfide with sulfurous acid.

The sodium carbonate produced as described above is employed as an aqueous solution in a scrubber to remove the residual sulfur dioxide from the gases coming from the absorber where the sulfur dioxide or trioxide rich gases are contacted with water. This reaction results in the conversion of the sodium sulfite which is concurrently reacted with the sodium sulfite in the above described low temperature reaction. Carbon dioxide is also released at this point.

Referring now to the drawing, there is schematically shown an arrangement suitable for practicing the process of the present invention. This arrangement comprises a cocurrent reactor 10, having a grate 15 and baffles 17, 19, is provided with inlet lines 12, 13, and 14 and outlet lines 16 and 18. Line 16 is in communication with an airlock 20 which in turn is in communication with a line 22. The line 22 discharges into acid reactor 24.

The acid reactor 24 comprises two chambers 26 and 30. The chambers 26, 30 are separated from one another by a partition 34 thus providing an air-tight space 36. The chamber 26 is provided with a horizontal screw 40 driven by a motor (not shown) and adapted to carry solid material from the chamber 26 to the chamber 30. The chamber 30 is provided with an incline 42 and a screw 44 which are driven by a motor (not shown) and are adapted to separate solid material from its supernatant liquid. The chamber 30 is provided with an agitator 50 driven by a motor 52. The chamber 30 is provided with a solids line 54 which is in communication with a first cooler-crystallizer 56. The cooler-crystallizer 56 is connected via line 57 to a centrifuge 59 which is provided with a liquid outlet line 58 and a solids outlet line 60. The liquid outlet line 58 provides the inlet to absorber 62 which is provided with outlet line 64 which discharges into the chamber 30 of the acid reactor 24.

The outlet line 18 of the cocurrent reactor 10 is in communication with line 66 wherein they together form line 68 which is the inlet to burner 70. Air to burner 70 is provided by air inlet line 72. Flue gasses from the burner 70 leave via line 74 to heat exchanger 76 and further via line 78 to a catalytic oxidation chamber 80. The flue gasses leave oxidation chamber 80 via line 82 which provides an inlet to absorber 62. The absorber 62 is provided with outlet line 84 which is also an inlet to scrubber 86. The scrubber 86 is provided with an outlet line 88 in communication with a centrifuge 90. The centrifuge 90 is provided with a solids outlet line 92 and a liquid outlet line 94. A portion of the material in line 94 can be recycled through line 96 by means of a valve 98. The remainder of the material in line 94 enters the second cooler crystallizer 100 via line 102. The cooler-crystallizer 100 is provided with an outlet line 104 which is an inlet to the scrubber 86. The cooler-crystallizer 100 is also provided with a solids outlet line 106 which is an inlet to a counter current reactor 108. The solid reaction products from counter current reactor 108 are passed on to the scrubber 86 via solids outlet line 109 or removed via solids outlet line 111 which is in communication with line 109. The solids outlet line 111 is provided with a valve 113.

The solids outlet line 60 is in communication with the counter current reactor 108. The line 60 is also connected via valve 122 to a line 120 which is in communication with the inlet line 12 to the cocurrent reactor 10.

The counter-current reactor 108 is provided with an inlet line 114 and an outlet line 116. The line 116 is in communication with an inlet line 13 to cocurrent reactor 10, via a valve 112. The line 116 is provided with an inlet line 118.

The chamber 30 of the acid reactor 24 is provided with an outlet line 124 which is an inlet line to a condenser-scrubber 126 which is provided with an inlet line 127. The condenser-scrubber 126 is provided with gas outlet line 128 and liquid outlet line 130, the latter line in turn is an inlet line to the chamber 36 of the acid reactor 24 via a valve 132. A line 134 is connected between the lines 127 and 130.

The invention is further illustrated by the following examples in which all parts and percentages are by weight unless otherwise indicated. These non-limiting examples are illustrative of certain embodiments and are designed to teach those skilled in the art how to practice the invention and to represent the best mode presently known for carrying out the invention.

EXAMPLE 1

Into the reactor 10 sodium sulfate and carbon are charged through the inlet line 12, hydrogen sulfide via line 13, and air and steam through the inlet line 14. Reactions occur in the reactor according to Equations 1 through 6.

(Eq. 1) $\quad\quad\quad C + \frac{1}{2}O_2 \rightarrow CO$ (Eq. 2) $\quad\quad\quad C + O_2 \rightarrow CO_2$ (Eq. 3) $\quad\quad\quad C + H_2O \rightarrow CO + H_2$ (Eq. 4) $\quad\quad\quad Na_2SO_4 \rightarrow Na_2S + 2O_2$ (Eq. 5) $\quad\quad\quad Na_2SO_4 + 4H_2 \rightarrow Na_2S + 4H_2O$ (Eq. 6) $\quad Na_2CO_3 + H_2S \rightarrow Na_2S + H_2O + CO_2$ which give rise to flue gases comprising $H_2S$, $CO_2$, $CO$, $N_2$ and $H_2O$ which go through the outlet line 18 and the solid reaction products ash, and $Na_2S$ in reactor 10 go through the grate 15 and pass via the outlet line 16, airlock 20 and line 22 to be discharged into the chamber 26 of acid reactor 24.

In order that the above reactions take place in reactor 10, carbon is charged in an atomic ratio of 1:1 to 10:1 with oxygen present in the reactor. The reactor 10 is maintained at a temperature of 600° to 750° C. under a pressure of 0 to 100 p.s.i.g. and the air injected should be in a ratio with carbon in the reactor mixture of less than 1:1.

The sodium sulfide in solids discharged through line 2 reacts with the acid introduced via line 64 to produce hydrogen sulfide according to Equations 7 and 8:

(Eq. 7) $\quad Na_2S + H_2SO_3 \rightarrow Na_2SO_3 + H_2S$ (Eq. 8) $\quad Na_2S + H_2SO_4 \rightarrow Na_2SO_4 + H_2S$ The hydrogen sulfide gas passes through the condenser-scrubber 126 via line 124 to yield pure hydrogen sulfide, devoid of carbon dioxide and other contaminating gasses. This hydrogen sulfide then goes via the outlet line 128 to storage.

The water in the condenser-scrubber 126 is continuously discharged into chamber 26 via the valve 132 and line 130. The condenser-scrubber 126 is replenished with fresh water via line 127. The slurry formed by agitator 50 from the solids and liquids in acid reactor 24 is pumped through the solids line 54 into the first cooler-crystallizer 56 to crystallize sodium sulfur compounds. After crystallizing the crystallizable compounds, the contents of the cooler crystallizer are passed via line 57 on to the centrifuge 59 where the solids are removed via solids outlet line 60 and the liquids via liquid outlet line 58. The solids in line 60 are supplied to the counter current reactor 108 or to the cocurrent reactor via valve 122 and line 120. The liquids in line 58 are pumped into the absorber 62 where they are contacted with sulfur oxides to replenish the acid used up in the acid chamber 24. The liquids concentrated in acid content in absorber 62 are sent back to the acid reactor 24 via line 64. The absorber 62 is generally maintained at 20 to 100° C. and preferably at 40 to 80° C. for optimum absorption.

Sulfuric acid is introduced into the chamber 30 of acid reactor 24 via line 64 in a ratio of acid to sodium sulfide, in solids charged through line 22, 1:1 to 50:1. The slurry from acid reactor 24 is passed through cooler-crystallizer 56 which is maintained at a temperature between 0° and 40° C. to facilitate quick crystallization of sodium sulfate.

The flue gases from cocurrent reactor 10 are passed via outlet line 18 to a burner 70 to oxidize hydrogen sulfide and carbon monoxide in them to oxides of sulfur and carbon dioxide respectively by contacting with air supplied via air inlet line 72. These flue gases from burner 70 are passed through line 74 to the heat exchanger 76 to maintain their temperature between 400° and 500° C. before passing them to the catalytic oxidation chamber 80 via line 78 to further oxidize sulfur dioxide to sulfur trioxide. The gases from the catalytic oxidation chamber 80 are injected into the supernatant acid liquor in absorber 62 via line 82 to enrich it in acid content by the absorption of sulfur trioxide to produce sulfuric acid. Thus, the acid spent in chamber 24 in liberating hydrogen sulfide from sodium sulfide is replenished in absorber 62 so that the spent liquor from centrifuge 59 which is enriched with acid can be recycled back to the acid reactor 24.

The chemical reactions that take place in burner 70 when the gases are burnt at 300° to 1000° C. by injecting air at a pressure of 0 to 80 p.s.i.g. via line 72 according to Equations 2, 9 and 10:

(Eq. 9) $\quad 2H_2S + 3O_2 \rightarrow 2H_2O + 2SO_2$ (Eq. 10) $\quad\quad SO_2 + \frac{1}{2}O_2 \rightarrow SO_3$ and those occurring in catalytic oxidation chamber 80 maintained at a temperature of 400° to 500° C. and in absorber 62 respectively are Equations 11 and 12:

(Eq. 11) $\quad\quad SO_2 + \frac{1}{2}O_2 \rightarrow SO_3$ (Eq. 12) $\quad\quad SO_3 + H_2O \rightarrow H_2SO_4$ A portion of the solids rich in crystalline sodium sulfate from centrifuge 59 are charged to the counter current reactor 108 via solids outlet line 60 to produce hydrogen sulfide by reaction with carbon, air and steam passed into the reactor 108 via inlet line 114. The gases containing liberated hydrogen sulfide are passed on to the burner 70 via outlet line 116 to utilize the sulfur compounds in these gases to enrich the supernatant acid liquor in absorber 62 following the cycle via the catalytic chamber 80.

By maintaining the counter current reactor 108 after adding the supplemental carbonaceous material via line 105, at a temperature of 200° to 650° C. under a pressure of 0 to 600 p.s.i.g. containing air at a pressure of 0 to 300 p.s.i.g. the reactions represented by Equations 1 through 4 and 13 through 15 take place:

(Eq. 13) $\quad\quad Na_2SO_3 \rightarrow Na_2S + \frac{3}{2}O_2$ (Eq. 14) $\quad Na_2S + H_2O + CO_2 \rightarrow Na_2CO_3 + H_2S$ (Eq. 15) $\quad Na_2SO_4 + CO_2 + H_2O \rightarrow$
$\quad\quad\quad\quad\quad\quad\quad\quad Na_2CO_3 + H_2S + 2O_2$ thus resulting in the gaseous products hydrogen sulfide, carbon dioxide, carbon monoxide, water vapor and oxygen and solid products ash and sodium carbonate. To the counter current reactor 108 concentrated spent pulping liquor available as a waste product can also be supplied via line 105.

The off gases from absorber 62 are passed via line 84 to a scrubber 86, containing not less than 5% sodium carbonate in solution maintained at a temperature not exceeding 80° C., to absorb any oxides of sulfur from the off gases to form sodium sulfate and sulfite according to the reactions represented by Equations 16 and 17:

(Eq. 16) $\quad Na_2CO_3 + SO_3 \rightarrow Na_2SO_4 + CO_2$ (Eq. 17) $\quad Na_2CO_3 + SO_2 \rightarrow Na_2SO_3 + CO_2$ The waste gases from scrubber 86 devoid of any atmospheric pollutants are let out into atmosphere via outlet line 89. The contents of scrubber 86 are charged to the centrifuge 90 via outlet line 88 to remove any solids in the liquids. The solids are rejected to waste via solids outlet line 92 and the liquids are sent to the second cooler-crystallizer 100 via line 102 to crystallize the sodium salts. The solids from cooler crystallizer 100 are carried on to the counter current reactor 108 via line 106 for the production of hydrogen sulfide and sodium carbonate. The mother liquor from crystallizer 100 and the sodium carbonate-containing ash from reactor 108 are charged to the absorber 86 via lines 104 and 109 respectively. The solids containing sodium carbonate passing through line 109 can be removed, as per its requirement in absorber 86, via the valve 113 and line 111 for the production of sodium carbonate.

EXAMPLE 2

The procedure of Example 1 is repeated except that the sodium sulfate is replaced with an equimolar amount of potassium sulfate with similar results.

EXAMPLE 3

The procedure of Example 1 is repeated except that the sodium sulfate is replaced with an equimolar amount of cesium sulfite with similar results.

EXAMPLE 4

The procedure of Example 1 is repeated except that the sodium sulfate is replaced with an equimolar amount of sodium sulfite with similar results.

Although the invention has been described in considerable detail with reference to certain preferred embodiments thereof, it will be understood that variations and modifications can be effected within the spirit and scope of the invention as described above and as defined in the appended claims.

What is claimed is:

1. A process for the synthesis of hydrogen sulfide free of carbon dioxide comprising the steps of:
   (I) reacting a sulfur-bearing material selected from the group consisting of sulfites and sulfates of alkali metals and mixtures thereof with gaseous oxygen, carbon, and steam under reducing conditions in the presence of hydrogen sulfide at a temperature of 400° to 1000° C. to produce the corresponding alkali metal sulfide,
   (II) reacting the alkali metal sulfide with acid to liberate hydrogen sulfide free of carbon dioxide,
   (III) supplying the hydrogen sulfide to Step I from an external source.

2. A process for the synthesis of hydrogen sulfide free of carbon dioxide comprising the steps of:
   (I) reacting a sulfur-bearing material selected from the group consisting of sodium sulfite, sodium sulfate and mixtures thereof with gaseous oxygen, carbon, and steam under reducing conditions at a temperature of 400° to 1000° C. in the presence of hydrogen sulfide to produce sodium sulfide,
       wherein the hydrogen sulfide is present in an amount in excess of the equilibrium vapor pressure of hydrogen sulfide in contact with sodium sulfide,
   (II) reacting sodium sulfide with acid to liberate hydrogen sulfide free of carbon dioxide,
   (III) supplying the hydrogen sulfide to Step I from an external source.

3. The process of Claim 1 wherein the partial pressure of hydrogen sulfide in Step I is greater than 0.02.

4. The process of Claim 1 wherein the temperature in Step I is less than 550° C. and wherein the partial pressure of hydrogen sulfide in Step I is given by the formula:

$$Pp. = 0.575 - \frac{.001t}{°C.}$$

wherein "t" is the temperature in ° C. of Step I.

5. The process of Claim 1 wherein the partial pressure of hydrogen sulfide in Step I is between $10^{-4}$ and 0.60.

6. The process of Claim 2 wherein the sulfur-bearing material is waste liquor from sulfur base paper pulping process.

7. The process of Claim 2 wherein the atomic ratio of carbon to oxygen present in the sulfur-bearing material is between 2:1 and 4:1.

8. The process of Claim 7 wherein the atomic ratio of gaseous oxygen to excess carbon is less than 1:1.

9. The process of Claim 2 wherein the gaseous oxygen is supplied as air.

10. The process of Claim 2 wherein the acid is a mineral acid.

11. The process of Claim 2 wherein the acid is sulfuric acid.

12. The process of Claim 2 wherein the acid is sulfurous acid.

13. The process of Claim 2 wherein the sodium sulfide is reacted at a temperature of 0° C. to 100° C.

14. The process of Claim 2 wherein the acid is employed in a stoichiometric excess.

15. A process of Claim 2 for the synthesis of hydrogen sulfide free of carbon dioxide comprising the steps of:
   (I) reacting at 400° to 1000° C. a sulfur-bearing material selected from the group consisting of sodium sulfite, sodium sulfate, and mixtures thereof with gaseous oxygen, carbon and steam in the presence of hydrogen sulfide to produce sodium sulfide,
       wherein the atomic ratio of carbon to oxygen present in the sulfur-bearing material is between 2:1 and 4:1,
       wherein the atomic ratio of gaseous oxygen to excess carbon is less than 1:1,
   11. The process of Claim 2 wherein the acid is sul- 0° to 100° C. to liberate hydrogen sulfide free of carbon dioxide,
   (III) supplying the hydrogen sulfide to Step I from an external source.

16. A process for the synthesis of hydrogen sulfide free of carbon dioxide comprising the steps of:
   (I) reacting a sulfur-bearing material selected from the group consisting of sodium sulfite, sodium sulfate, and mixtures thereof with gaseous oxygen, carbon and steam under reducing conditions at a temperature of 600° to 750° C. in the presence of hydrogen sulfide to produce sodium sulfide,
   (II) reacting the sodium sulfide with sulfuric acid to liberate hydrogen sulfide free of carbon dioxide and to produce sodium sulfate,
   (III) reacting the sodium sulfate with carbon, oxygen and steam to produce sodium carbonate and hydrogen sulfide,
   (IV) reacting a part of the hydrogen sulfide from Step III with oxygen to produce a mixture of sulfur trioxide and sulfur dioxide,
   (V) reacting the mixture of sulfur trioxide and sulfur dioxide with water to produce sulfuric acid and sulfurous acid,
   (VI) conveying the sulfuric and sulfurous acid to Step II,
   (VII) contacting the sodium carbonate from Step III with the gaseous sulfur dioxide from Step V to produce sodium sulfite,
   (VIII) reacting the sodium sulfite and sodium sulfate concurrently in Step III,
   (IX) supplying a part of the hydrogen sulfide from Step III to Step I.

17. A process for producing pure hydrogen sulfide substantially free of contaminating gases comprising the steps of:
   (I) contacting at 600° to 750° C. sodium sulfate, carbon, hydrogen sulfide, steam, and air,
       wherein the molar ratio of carbon to oxygen is 1:1 to 10:1 the volume percent of hydrogen sulfide is at least 1% of the total volume of gases;

the pressure of steam is 0.5 to 4 p.s.i.g.; the volume percent of air is 35% to 75%; to produce sodium sulfide and flue gases comprising hydrogen sulfide, carbon monoxide, carbon dioxide, water vapor, and nitrogen;

(II) contacting at 20° to 100° C., the sodium sulfide from Step I with concentrated sulfuric acid solution wherein the concentration of the sulfuric acid is between 0.1 gram moles per liter to 2 gram moles per liter; the molar ratio of sulfuric acid to sodium sulfide is between 2:1 and 10:1 to produce gases containing hydrogen sulfide and water vapor substantially free of contaminating gases and a sludge consisting essentially of sodium sulfate, ash, and water;

(III) passing the gases from Step II through a scrubber at 25° to 40° C. to produce pure hydrogen sulfide and a saturated solution of hydrogen sulfide, (IV) recycling the saturated solution of hydrogen sulfide from Step III to Step II;

(V) cooling the sludge from Step II to 20° to 30° C. to produce solids rich in crystalline sodium sulfate and a supernatant acid liquor;

(VI) separating the solids rich in crystalline sodium sulfate from the supernatant acid liquor;

(VII) burning the flue gases from Step I with air to oxidize hydrogen sulfide and carbon monoxide to produce respectively sulfur dioxide and carbon dioxide;

(VIII) contacting the combustion products from Step VII with an oxidizing catalyst at 200° to 400° C. to convert sulfur dioxide to sulfur trioxide;

(IX) contacting the effluent from Step VIII with the supernatant acid liquor from Step VI to produce a concentrated sulfuric acid solution and off gases containing sulfur dioxide, water vapor, carbon dioxide, nitrogen, and oxygen;

(X) recycling the concentrated sulfuric acid solution from Step IX to Step II to generate hydrogen sulfide from sodium sulfide;

(XI) contacting the solids rich in crystalline sodium sulfate from Step V at 500° to 550° C. with air and steam, wherein the pressure of the steam is 5 to 80 p.s.i.g. and the volume percent of air is 5% to 60% to produce gases containing at least 10% hydrogen sulfide and solids comprising sodium carbonate and ash;

(XII) contacting the off gases from Step IX with a solution of at least 5% by weight of sodium carbonate at 25° to 80° C. to dissolve any residual oxides of sulfur;

(XIII) centrifuging the solution from Step XII to separate any solids from the liquid;

(XIV) cooling the supernatant liquid from Step XIII at 20° to 30° C. to produce solids containing crystalline sodium carbonate, sodium sulfate, and sodium sulfite; as well as a mother liquor containing salts of sodium;

(XV) subjecting the solids from Step XIII to Step IX;

(XVI) recycling the mother liquor from Step XIV to Step XII.

References Cited
UNITED STATES PATENTS

| | | | |
|---|---|---|---|
| 3,574,543 | 4/1971 | Heredy | 423—242 |
| 2,106,952 | 2/1938 | König | 423—561 |
| 1,435,471 | 11/1922 | Howard | 423—563 |
| 2,808,317 | 10/1957 | Schmalenbach et al. | 423—571 |

OSCAR R. VERTIZ, Primary Examiner

H. S. MILLER, Assistant Examiner

LQM&D 601

UNITED STATES PATENT OFFICE
CERTIFICATE OF CORRECTION

Patent No. 3,819,817      Dated June 25, 1974

Inventor(s) W. Van Slyke

It is certified that error appears in the above-identified patent and that said Letters Patent are hereby corrected as shown below:

Column 2, Line 6, delete "imetal" and insert --metal--.

Column 5, Line 43, delete "reactor" and insert --reaction--.

Column 5, Line 46, delete "2" and insert --22--.

Column 7, in the equation on Line 72, delete "Pp." and insert --pp.--.

Column 8, Line 35, delete the line and insert in its place

--(II) reacting the sodium sulfide with sulfurous acid at--

Signed and sealed this 15th day of October 1974.

(SEAL)
Attest:

McCOY M. GIBSON JR.            C. MARSHALL DANN
Attesting Officer               Commissioner of Patents